United States Patent [19]
Abrams et al.

[11] 3,728,020
[45] Apr. 17, 1973

[54] APPARATUS AND METHOD OF COPYING ON A PLURALITY OF DIVERSE COPY MEDIA

[75] Inventors: Martin Abrams, Chicago; Kenneth B. Tafel, Palatine, both of Ill.

[73] Assignee: AES Technology Systems, Inc., Elk Grove Village, Ill.

[22] Filed: Dec. 8, 1970

[21] Appl. No.: 96,099

[52] U.S. Cl. ......................355/66, 355/14, 355/65, 355/57
[51] Int. Cl. ............................................G03b 27/70
[58] Field of Search......................355/13, 14, 29, 45, 355/57, 64, 65, 66

[56] References Cited

UNITED STATES PATENTS

| | | | |
|---|---|---|---|
| 2,458,769 | 1/1949 | Debrie | 355/46 X |
| 3,320,853 | 5/1967 | Froese | 355/46 |
| 3,459,888 | 8/1969 | Sokolov | 355/46 X |
| 2,845,841 | 8/1958 | Collins | 355/65 X |
| 3,352,218 | 11/1967 | Ostensen | 355/14 X |
| 3,490,843 | 1/1970 | Charlap et al. | 355/14 |
| 3,503,677 | 3/1970 | Uchiyama | 355/13 |
| 3,572,924 | 3/1971 | Matsumoto | 355/57 |

*Primary Examiner*—Samuel S. Matthews
*Assistant Examiner*—E. M. Bero
*Attorney*—Dressler, Goldsmith, Clement & Gordon

[57] ABSTRACT

Apparatus and method of copying original documents in which the document to be copied is transported along a document feed path to a position for exposure. Different type copies are produced on diverse copy media, e.g., copy paper and microfilm, simultaneously by exposing the copy media to a focused image of the document and the surrounding field. Plural copies can be made on some media, e.g., copy paper. Typically, the paper copy is of the document and the surrounding field while the microfilm copy is more limited, being primarily of the document. A selected number of different type copies may be produced of each document. The number of paper copies may be different than the number of microfilm copies.

24 Claims, 12 Drawing Figures

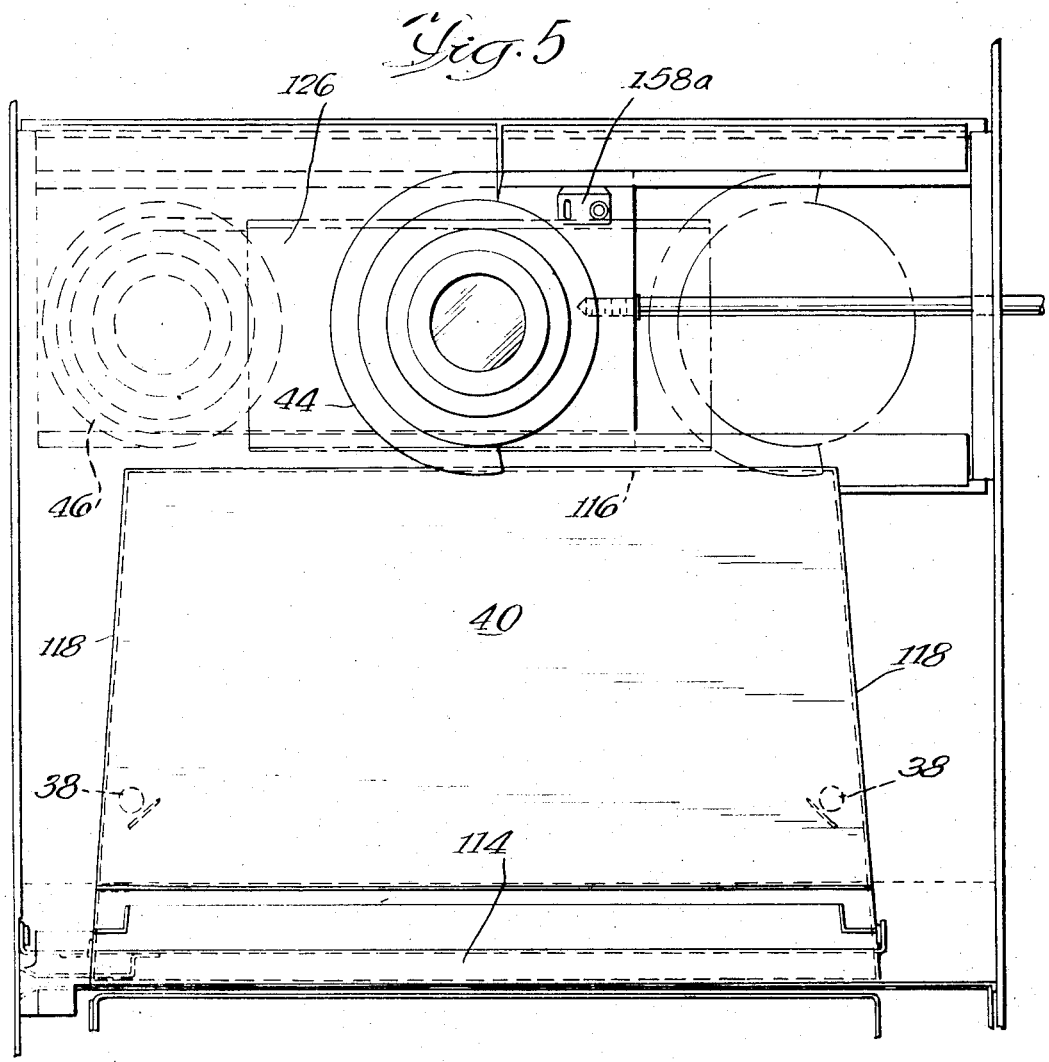
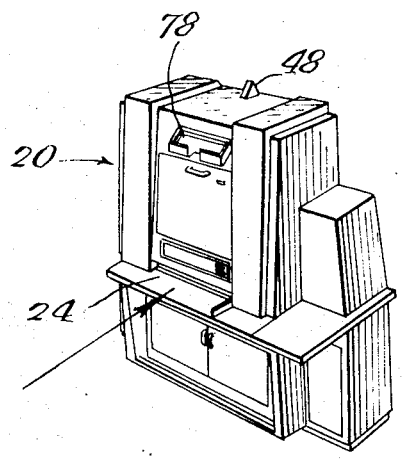

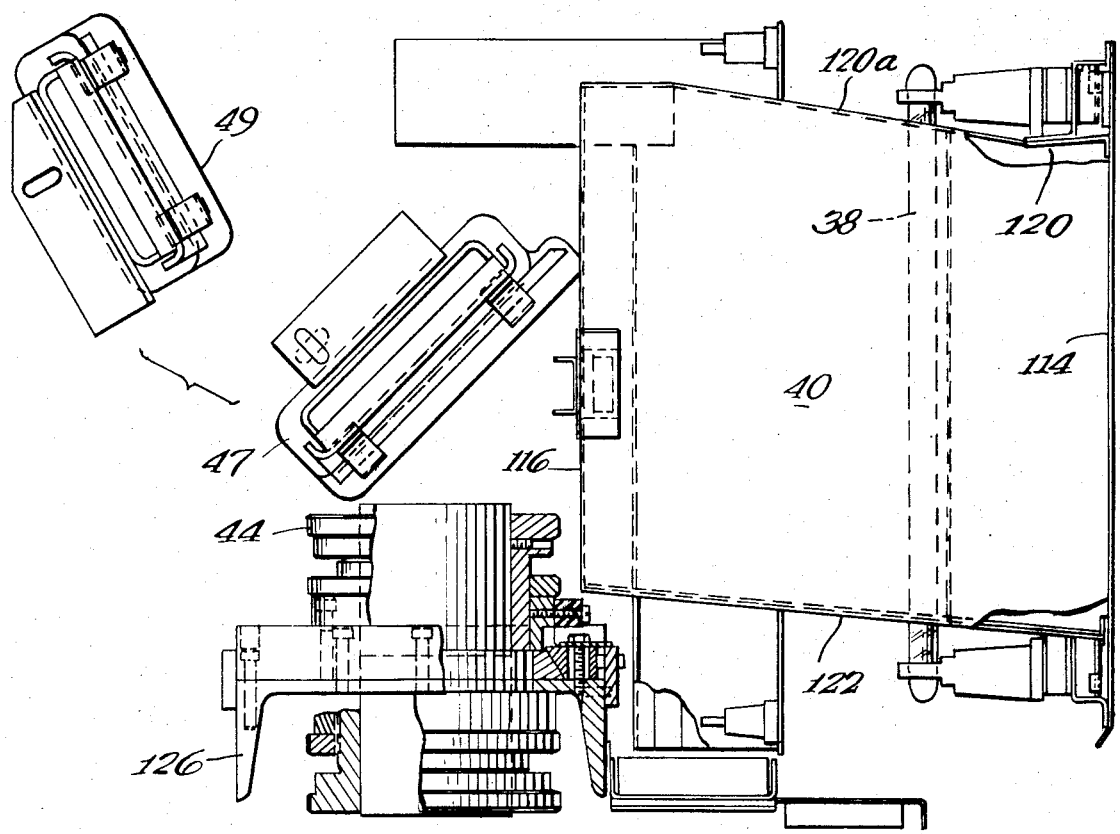
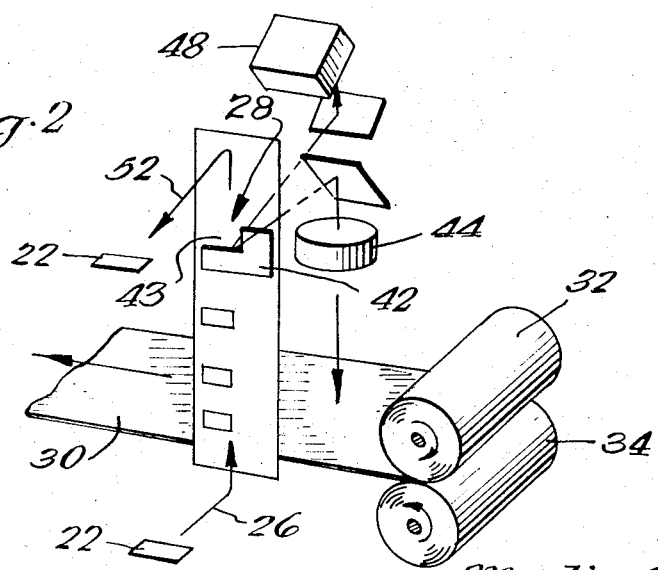

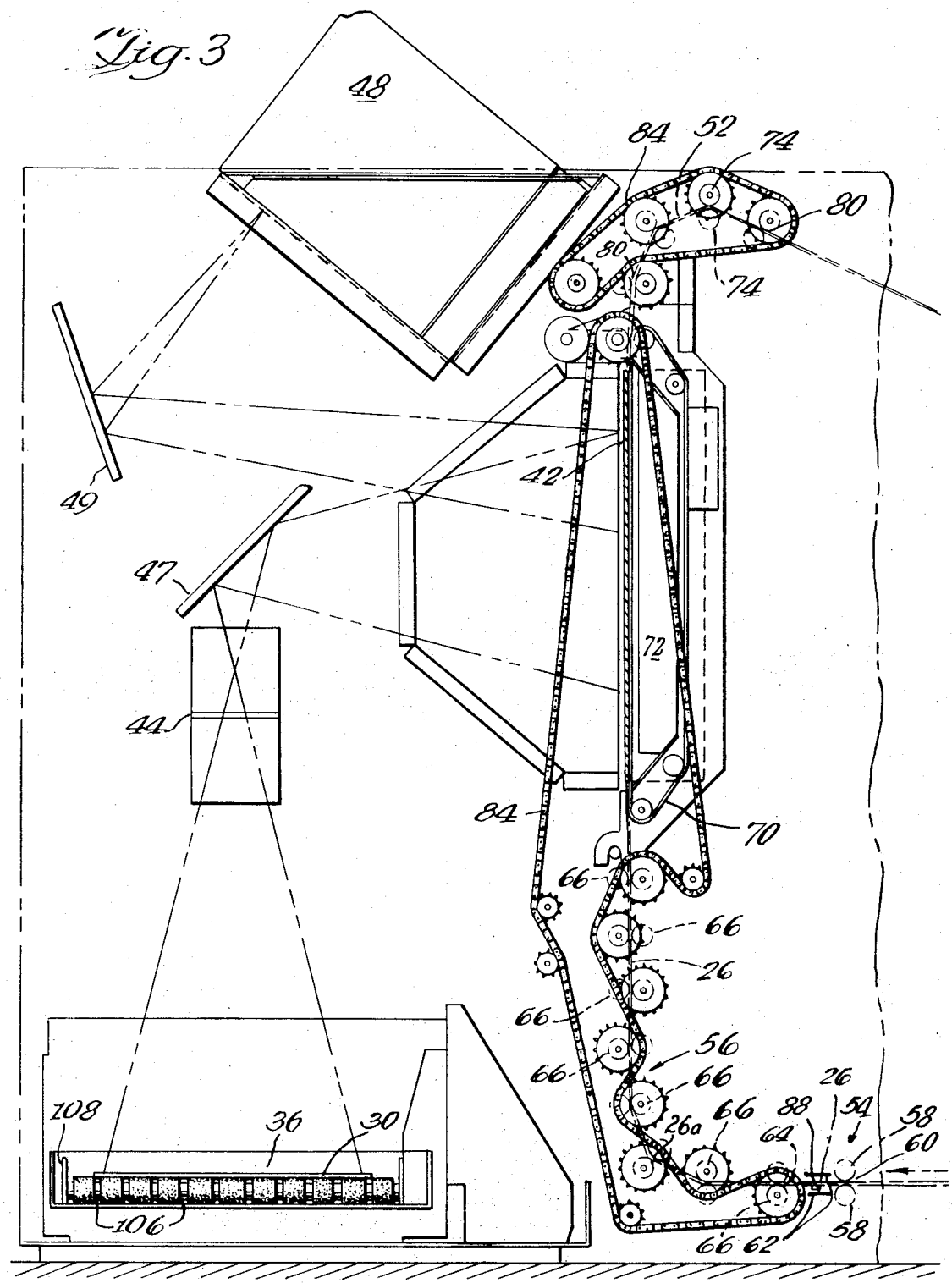

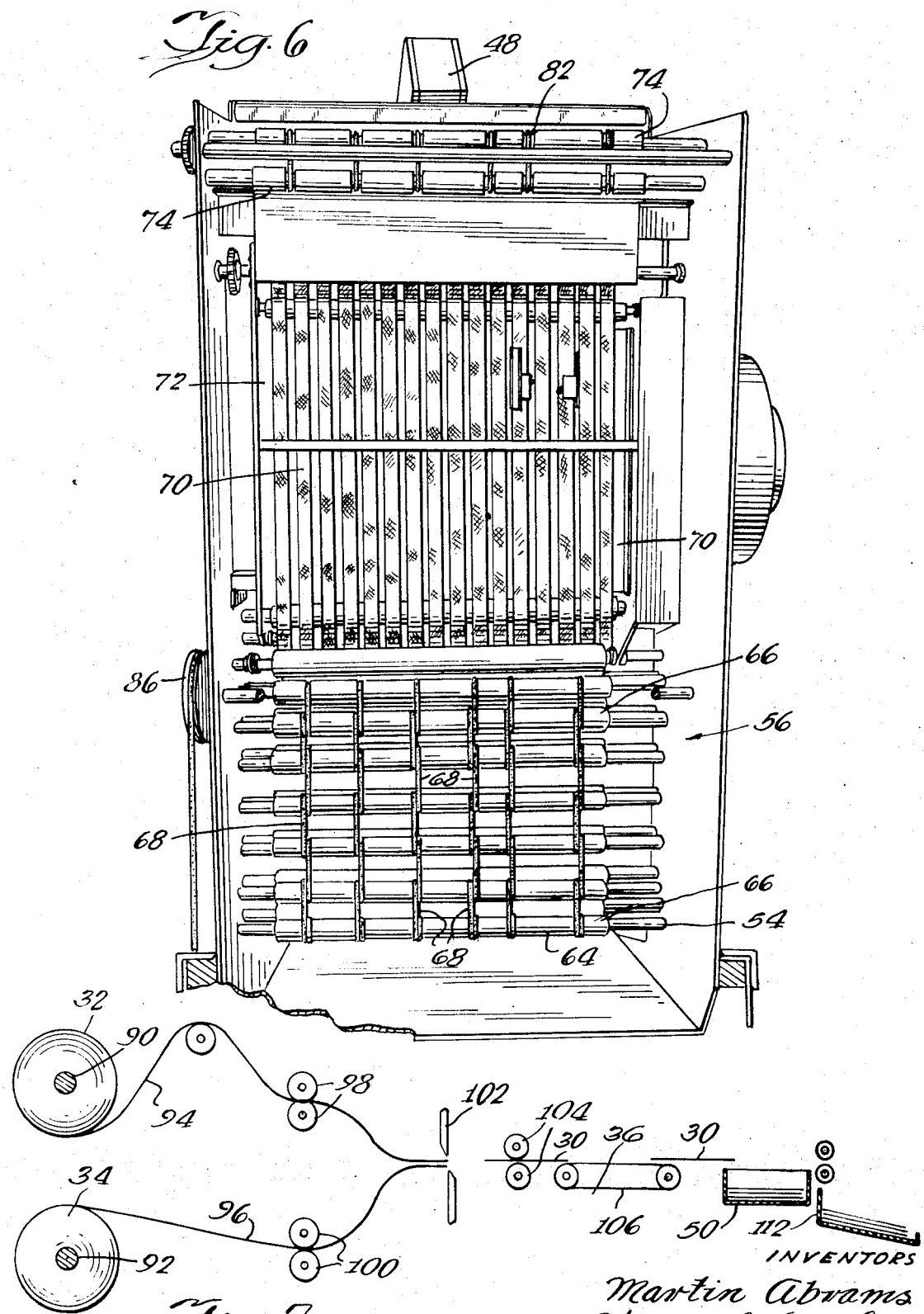

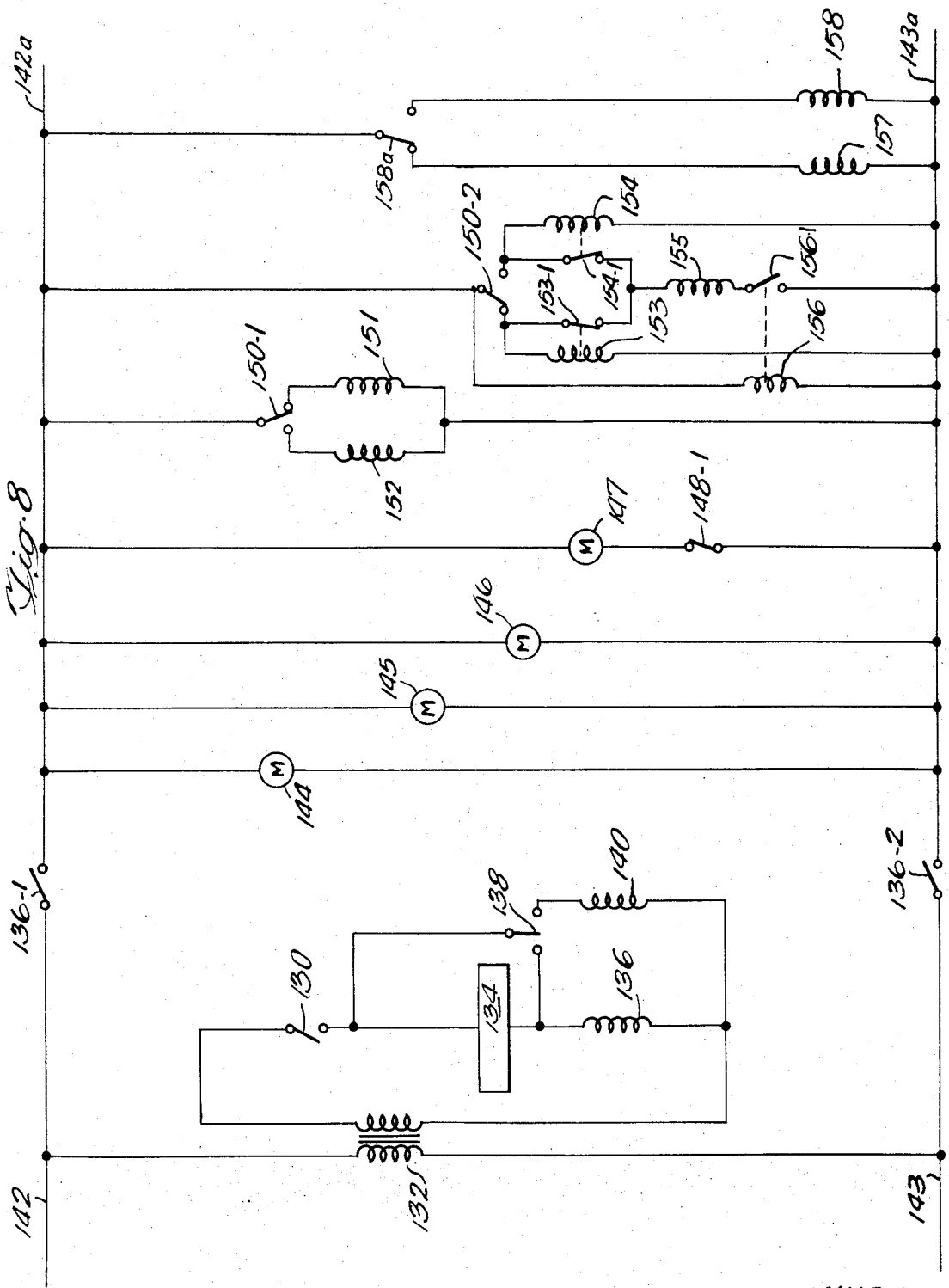

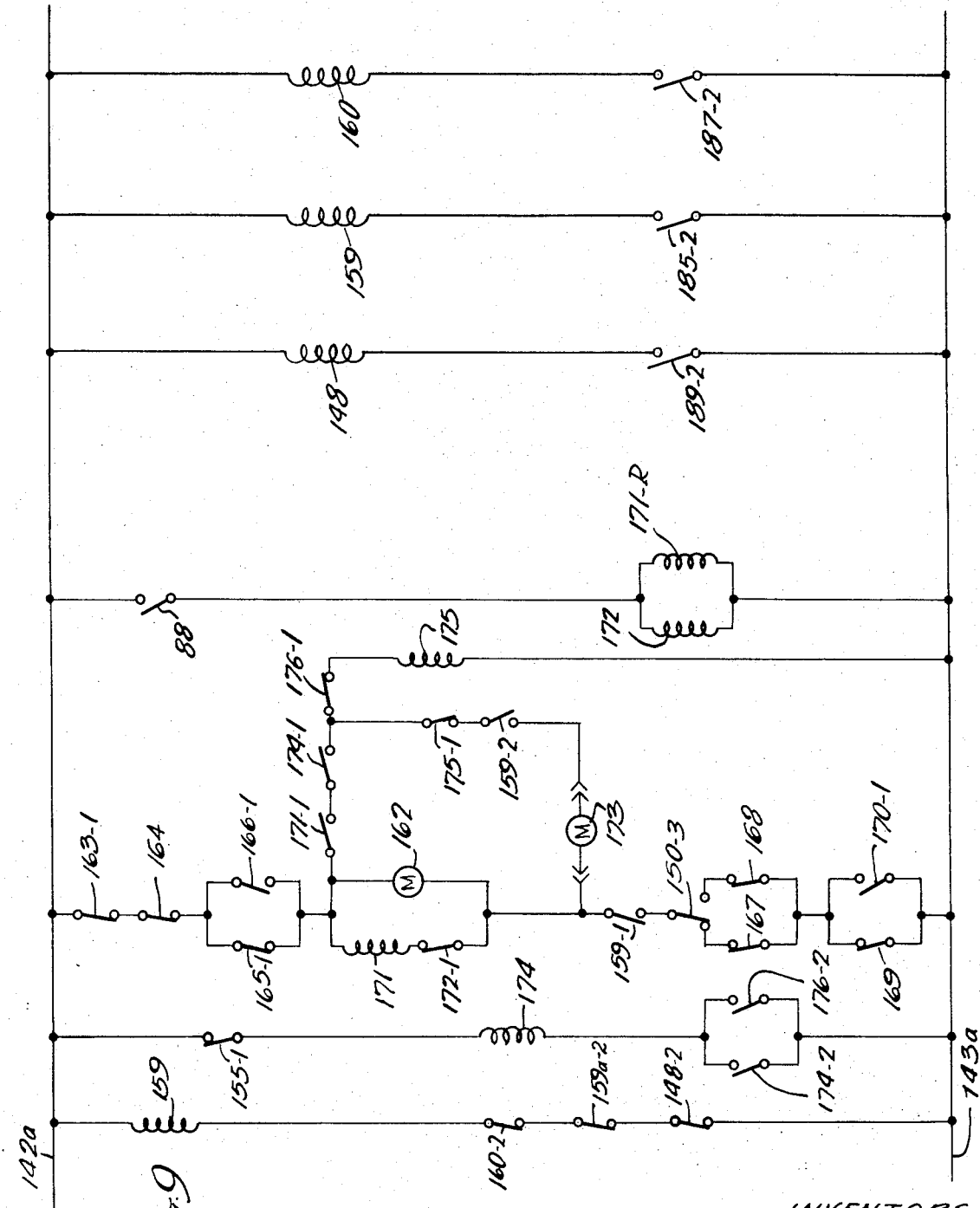

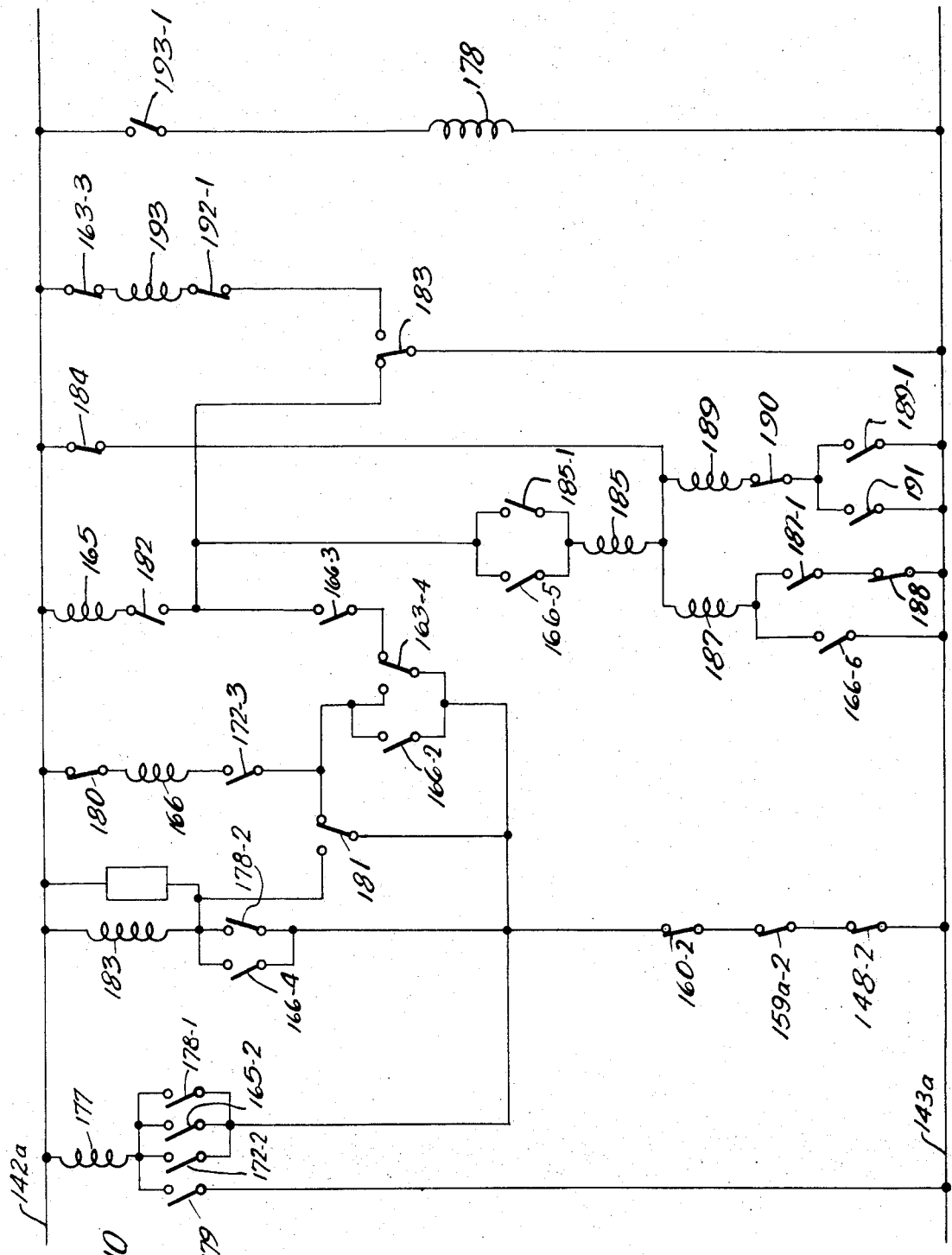

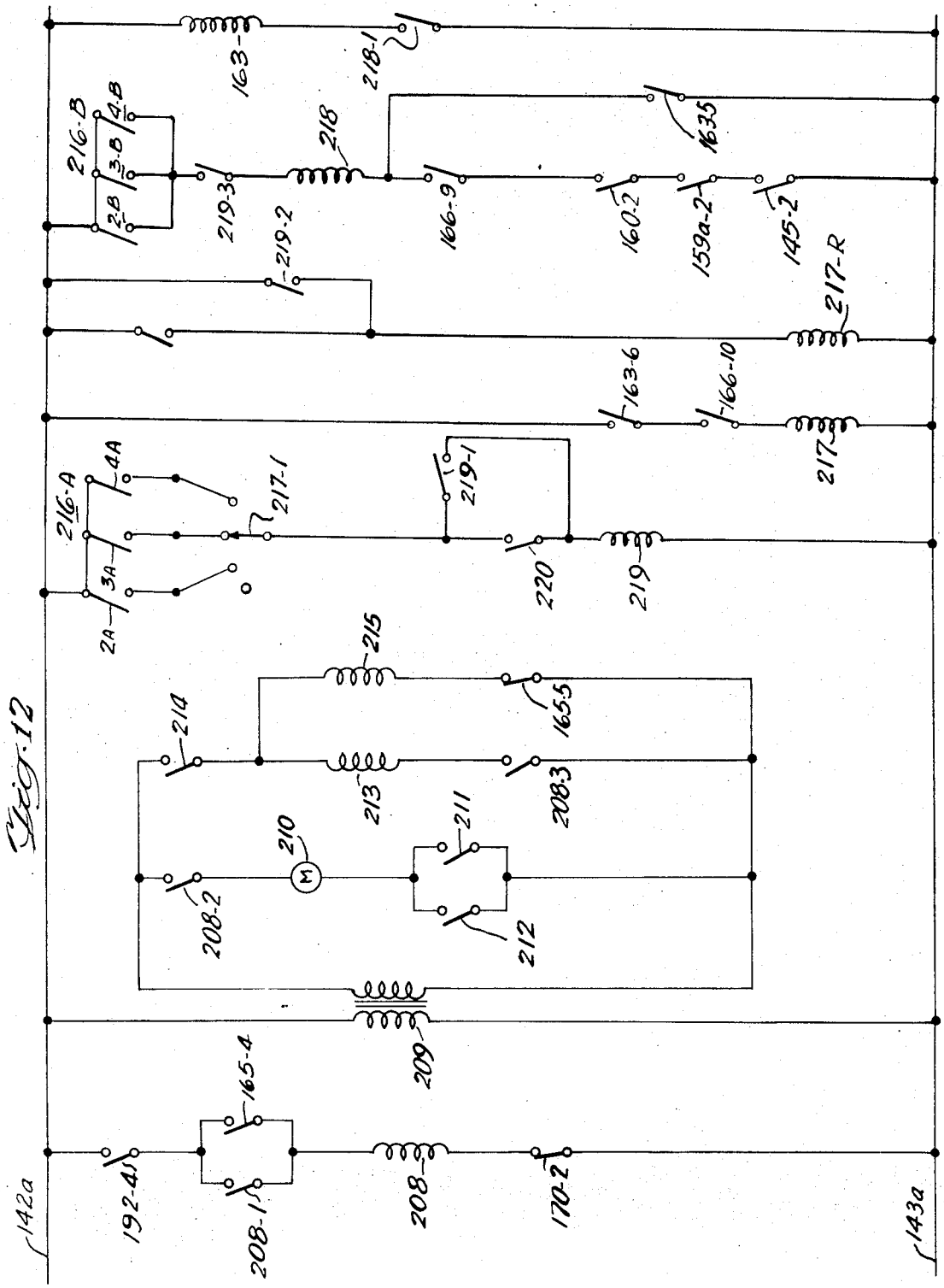

APPARATUS AND METHOD OF COPYING ON A PLURALITY OF DIVERSE COPY MEDIA

BACKGROUND

In today's credit society, where invariably a large percentage of purchases are charged, it becomes important to efficiently process money received in payment of monthly or periodic statements. Usually such payments, typically checks, are addressed to a particular creditor and mailed to a box number. The checks usually are not processed by the creditor itself, but by an agent of the creditor who is also handling and processing payments for a number of creditors.

Banks and other financial institutions are often in what is known as the "lock box" business of receiving checks in payment of clients' statements, processing these checks for the purpose of recording their receipt and inserting the necessary accounting information for use by the creditor or by data processing systems typically being utilized by a large number of institutions.

Since the check itself cannot be retained for any extensive period of time, it being necessary to clear the check and process it for payment, some means must be utilized to insure proper crediting of appropriate accounts and information must be available for the necessary accounting procedures.

One approach to providing and obtaining desired records of the received payments is to make a copy of the check. Appropriate notations and accounting information may be included or added to the copy. The copy may be larger than the check itself and include space for the entry of additional data and information.

One of the problems in producing copies of checks is the odd size of such documents and the variation in check sizes. The sizes of the documents to be copied create problems, one of which relates to the proper registration of the document for copying. This registration problem, particularly if such registration is to be effected automatically and on a continuous basis for successive documents, can be readily appreciated and is accenturated by the use of documents of various sizes.

In addition to the problem of document registration, different size documents suggest either the need of providing for different size copies or if uniform copies are desired, the ability to 34 the copy mechanism and procedure to provide such uniform copies from different size documents. This particular problem is further accentuated by the desire to provide space for auxiliary accounting and processing data on the copy of the original document.

It may also be desirable to provide a permanent record copy of the received check such as a photocopy or microfilm. The problems discussed above all apply equally to the problem of producing such permanent records. In addition, it is often desirable to reduce the amount of or eliminate auxiliary data from such permanent copies and produce copies primarily of the document.

Clearly it would be desirable to provide a method and apparatus which could conveniently, economically, efficiently and automatically provide desired hard copies or working copies of documents such as checks, which working copies could incorporate space and forms for additional data, and for simultaneously providing a permanent record copy of the document itself.

Such an approach, eliminating duplicative efforts, reducing the number of manual manipulations and thereby decreasing the cost of processing such documents would be of particular benefit in the credit industry in view of the ever increasing cost of credit and the resulting squeeze on the profits of either the original creditor and of the organization processing such documents for its clients.

SUMMARY OF THE INVENTION

In accordance with the present invention there is provided apparatus and method which overcome the deficiencies of existing approaches and which provide a capability for producing copies of various size documents.

An apparatus and method in accordance with the present invention provides the capability of automatically producing a selected number of different types of copies of original documents on diverse copy media. As an example, both transparent and opaque copies can be produced of various size original documents with the capability of producing a different number of each type of copy of each document.

In addition, not only can a plurality of different type copies be produced in accordance with the present invention, but some or all of the different type copies may alternatively be limited to the document itself and may incorporate a field larger than, and encompassing, the original document, such enlarged field allowing for the desired entry of appropriate additional and supplemental data.

Apparatus and method in accordance with the present invention includes the capability of automatically positioning original documents for copying. Such an apparatus includes the capability of simultaneously making a permanent record copy, such as, for example, a microfilm copy, of the original document and of simultaneously producing one or more hard or working copies of the document. The hard copy typically incorporates an enlarged field adjacent to the document allowing for the entry of appropriate additional and supplemental data allowing for the use of the working copies for various information processing purposes.

Furthermore, because of the varying size of the documents to be copied, and the various uses and applications for the working copies, the present invention includes the capability of selectively varying the size of the working copy while simultaneously producing permanent record or microfilm copies of constant size.

To facilitate the copying of various size original documents and the production of working copies of various sizes, a plurality of rolls of continuous web copy paper of differing widths are provided, each roll being conveniently selectable and the copier being automatically adaptable to handle paper from any of the selected rolls. In addition to the variable width hard copy obtainable by the use of multiple continuous web rolls of copy paper, the length of each copy may be selectively adjusted as desired.

More specifically, a copier in accordance with the present invention includes means for transporting a document to be copied along a document feed path to a document exposure position where registration of the original document is effected automatically. Because of the varying sizes of the original documents to be copied, the document feed system includes a dynamic feed system which may operate intermittently to stop the document in proper alignment and registration for exposure. Alternatively, the document feed system may operate continuously, exposure being effected on the fly. This is possible because of the short exposure time.

The proper positioning of the document is assured by utilization of a dynamic moving paper guide as a part of the document feed system and by the use of a vacuum system in the area of the document exposure position. The dynamic paper guide and vacuum system not only insure proper orientation and registration of the document being copied but also maintains the document in the appropriate focal plane to insure that the image to which the permanent record copy and the hard working copy are exposed is properly focused.

The introduction of a document into the document feed system activates the copy paper feed system which initiates feed of the web of copy paper from a selected roll. When the desired length of paper has been fed from the selected roll, a discrete sheet is severed from the web and transported into position for exposure and copying. Proper positioning of the severed sheet of copy paper is insured by the utilization of moving guide belts in conjunction with a copy paper vacuum system which accurately and properly positions the copy paper in registration for exposure.

Simultaneously, if permanent record microfilm copies are to be produced, the introduction of the documents initiates microfilm sequence to advance the microfilm for subsequent exposure.

In the intermittent mode of operation, the document feed system is re-energized subsequent to exposure to transport the original document from the exposure position along a document exit path while simultaneously transporting the next document to be copied along the document feed path to the exposure position.

Alternatively, multiple hard or working copies of each original document can be obtained while simultaneously limiting the number of permanent record or microfilm copies, the operation of the copier being automatically conditioned to repeat the copy paper feed cycle while inhibiting operation of the document feed system until the desired number of hard or working copies are obtained.

Copies are produced by exposing each of the copy media, the microfilm and the hard copy paper, to a focused image of the document and surrounding field. In the case of the microfilm, the camera is located so that the microfilm is exposed primarily to the focused image of the document itself. Typically, the microfilm camera is located in a position such that the focused image of the document is reflected to the camera lens by a suitable reflector.

The hard copy is exposed to an image typically including not only the document but the surrounding field, the image being reflected by a suitable reflector through a selected one of a number of available lenses. Typically, one lens is designed to produce a full size copy while other lenses may be designed to produce either enlarged or reduced size copies. The selection of an appropriate lens automatically controls the copy paper feed mechanism so that the copy paper is properly positioned in accordance with the size of the image to which it is exposed.

The copier of the present invention is also adaptable to control the operation of an automatic document feed mechanism of any suitable type for automatically introducing documents to be copied into the copier. While the automatic document feeder does not form a part of the present invention, control circuitry forming a part of the copier is provided to coordinate the operation of such an automatic feeder with the operation of the document in feed section, the document feeding operation, and the exposure control system so that any desired number of copies can be readily obtained automatically.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

BRIEF DESCRIPTION OF THE DRAWINGS

FIG. 1 is a perspective diagrammatic view of one embodiment of a copier in accordance with the present invention;

FIG. 2 is a diagrammatic view of the operation of the copy machine of the present invention;

FIG. 3 is a diagrammatic side view of the copy machine;

FIG. 4 (with FIG. 2) is a partial side view showing some of the components of the copier of the present invention;

FIG. 5 (with FIG. 1) is a top view of the exposure chamber;

FIG. 6 is a front view showing the document feed system;

FIG. 7 is a diagrammatic view of the copy paper feed system; and

FIGS. 8–12 are diagrammatic circuit diagrams of the electrical control circuit for the copier of the present invention.

DETAILED DESCRIPTION OF SPECIFIC EMBODIMENT

Figure 11:
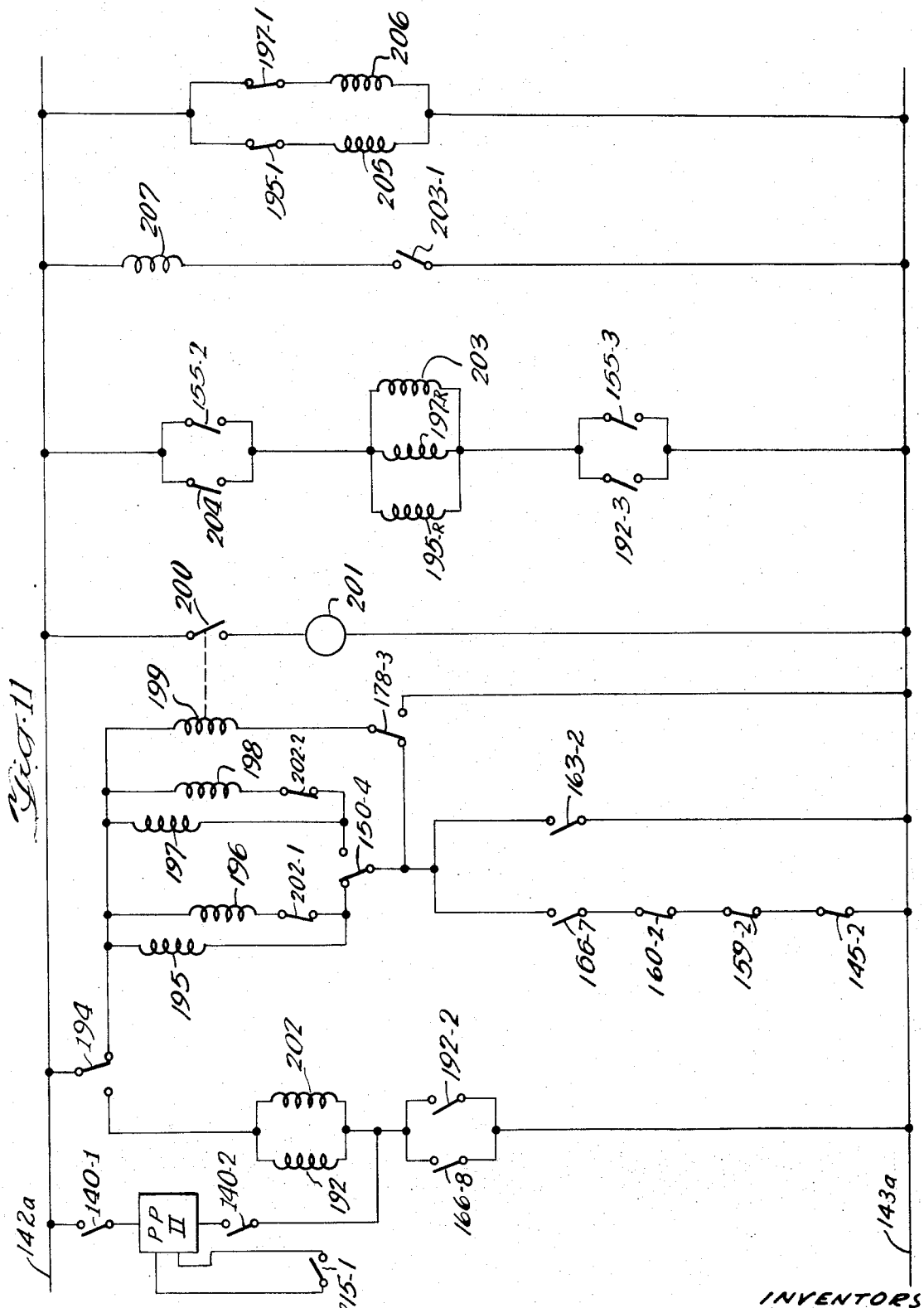

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The copier 20 of the present invention is adapted to receive a document 22 to be copied at its document inlet 24 and transport it along a document feed path 26 to a document exposure position 28 where the document is automatically stopped in proper orientation and registration for copying. In response to the introduction of a document 22 into the document feed path 26, a discrete sheet of copy paper 30 is severed from a selected one of a plurality of rolls of copy paper, two rolls 32, 34 being shown, and transported to a copy exposure position 36. Simultaneously, an unexposed portion of a permanent record medium, typically microfilm, is advanced to an exposure position.

Exposure is initiated upon registration of the document 22, the discrete sheet of copy paper 20 and the microfilm. Exposure is effected by a pair of flash units, typically strobe lamps 38, disposed in an exposure chamber 40 designed to provide the desired illumination of the document 22 without glare and with a minimum of shadows.

The discrete sheet 30, which is to form a hard copy or working copy, is exposed to a focused image of the entire focal plane field illuminated by the strobe lamps 38, i.e., the original document 22 as well as an auxiliary pre-printed field defined by a mask 42 having a document cut out 43 inserted along the front of the exposure chamber 40, through one of a pair of lenses 44, 46, the image being reflected through the selected lens by a paper copy mirror 47. One of the lenses 44, typically is designed to produce a full size image, while the other lens 46 is designed to produce either a magnified or a reduced scale image.

The microfilm, located in a camera 48 supported generally in the top of the copier, is exposed primarily to a focused image of the document 22, the image being reflected to the lens of the microfilm camera by another microfilm mirror 49.

If more than one hard copy is to be produced, the copier automatically discharges the exposed sheet of copy paper through a copy processor 50, which may be a standard zinc oxide copy processor, or any other suitable copy processor, and simultaneously transports the next discrete sheet of copy paper into position for subsequent exposure. When multiple hard copies are being produced, the microfilm camera 48 is inactivated after the initial exposure, so that subsequent exposures of the document to produce additional hard copies do not produce unneeded extra permanent record copies, one being sufficient.

When the last hard copy is produced, the original document 22 is discharged from the copier 20, being transported along a document discharge path 52, and the next succeeding document is transported along the document feed path 26 into position for exposure and for production of the desired number of hard copies and the desired record copy.

Because of the variety of sizes of original documents being processed, the copier utilizes a dynamic document infeed system 54 and a dynamic document feed system 56 for insuring proper orientation and location of the documents to be copied in the desired exposure position. The document 22 is introduced into the dynamic document infeed system 54 through the document inlet 24 located at the bottom of the copier 20. The document 22 is introduced either manually or by an automatic document feeder (not shown) which does not form a part of the present invention, although the copier 20 may include circuitry for controlling and synchronizing the operation of such an automatic document feeder with the operation of the copier.

The dynamic document infeed system 54 shown in the drawings includes a pair of driven infeed rollers 58, each of the rollers 58 being disposed on opposite sides of the document feed path 26, the pair of rollers defining a nip 60 disposed along the document feed path 26.

The document infeed rollers 58 are driven by a document infeed brake motor which is selectively energized to drive the document infeed rollers 58 intermittently as described in more detail below.

A pair of spaced apart stationary guide plates 62 are disposed on either side of the document feed path 26 to guide the document 22 from the nip 60 of the infeed rollers 58 to the nip 64 of the first pair of a plurality of pairs of document feed rollers 66 spaced along the document feed path 26, which as disclosed, includes a generally arcuate portion 26a as the document is transported from a generally horizontal plane to a generally vertical plane. The plurality of document feed rollers 66 are generally the same as the infeed rollers 58, each of the rollers 66 of each pair being spaced on either side of the document feed path 26, the path extending through the nips 64 of the successive pairs of rollers 66.

A plurality of dynamic document guides in the form of flexible tensioned endless belts 68 extend around adjacent rollers 66 on each side of the document feed path 26 to assist in transporting the document 22 along the path 26 from one pair of rollers 66 to the next and to maintain the document 22 in desired orientation.

The document feed rollers 66 and dynamic paper guides 68 transport the document 22 along the document feed path 26 until the document reaches the bottom of the exposure chamber 40. The document 22 is transported across the front of the exposure chamber 40 by a plurality of driven flexible endless traveling belts 70 which carry the document 22 up to the document exposure position 28, typically located at the top of and along one side of the front of the exposure chamber 40, as defined by the cut out 43.

The endless traveling belt 70 pass behind the mask 42 along the surface of a document platen 72 which defines and closes off the front of the exposure chamber. The platen is provided with a large number of small apertures (not shown) therein connected to a document vacuum pump. The document is retained against the traveling belts 70 adjacent to the surface of the platen 72 by a vacuum drawn through the platen apertures by the document vacuum pump.

A plurality of pairs of document discharge rollers 74, disposed above the exposure chamber 40 define the generally arcuate document discharge path 52 along which the document is transported from the exposure chamber 40 after exposure is completed, to the outlet 78 of the copier 20 located near the top of the copier. The plurality of pairs of document discharge rollers 74 are of the same general configuration as the document feed rollers 66, each of the rollers 74 of each pair being disposed on each side of the document discharge path 52 with the nip 80 between the rollers 74 defining the discharge path 52. A plurality of flexible tensioned endless belts 82 extending around adjacent rollers 74 on each side of the document discharge path 52 act as dynamic document guides.

The entire document feed system 56, including the document feed rollers 66, the driven flexible endless traveling belts 70, and the document discharge rollers 74, are connected to and driven by a chain drive 84 connected to a pulley 86 which in turn is driven by a continuously running document feed motor. A document feed clutch and document feed brake, as described in greater detail below, are alternatively energized to start and stop the document feed system 56.

When a document 22 is properly registered in the exposure chamber 40, the document feed clutch is de-energized and the document feed brake is energized to stop the document feed system 56 with the document properly positioned for copying. After the desired copies have been produced, the document feed clutch is re-energized and the document is transported along the document discharge path 52 while the next document is transported along the document feed path 26 to the exposure chamber 40.

A document sensing and system start switch 88 located between the document infeed rollers 58 and the first pair of document feed rollers 66 is actuated by a document introduced into the document feed path 26. The document sensing switch 88 performs two functions. First it initiates a document misfeed timing circuit which operates to generally shut down the copier if the document does not arrive at the exposure position within a selected time interval. Secondly, as explained in greater detail below, it initiates operation of the various other components in the copier which become activated in response to the presence of a document introduced into the document feed path.

Hard copies or working copies of the original document are produced on discrete sheets 30 severed from a selected one of the pair of rolls 32, 34 of copy paper. Each of the two rolls 32, 34 are rotatably supported on a spindle 90, 92, respectively and are each prevented from rotation by a selectively operable spindle brake. When one of the rolls, e.g., 32, is selected, the spindle brake for the other roll 34 is activated to preclude undesired movement of the unselected paper roll 34.

The web 94, 96 from each roll 32, 34 of copy paper is led into the nip between a pair of first copy paper feed rollers, there being a pair of first copy feed rollers 98, 100 for each web 94, 96, respectively. The copy paper passes from the output of each of first copy feed rollers 98, 100 through a copy paper cutter 102 through a pair of second copy feed rollers 104 onto a plurality of driven flexible endless traveling belts 106 passing along the surface of a copy paper platen 108 provided with a large number of apertures (not shown) therein connected to a copy paper vacuum pump. The copy paper is retained against these traveling endless belts 106 adjacent to the surface of the copy paper platen 108 by a vacuum drawn through the platen apertures.

When the copy paper 30 is in exposure position 36, the copy paper feed rollers 104 and traveling belts 106 are stopped. After exposure, the copy paper feed mechanism is re-energized and discharges the exposed sheet of copy paper through a copy paper processor 50, into the copy paper discharge tray 112. If additional copies are to be produced, the next sheet of copy paper is simultaneously transported to the copy paper exposure position.

The exposure chamber 40 is in the form of a generally truncated pyramid of rectangular cross section, the base or front 114 which is disposed at the front of the copy machine and closed by the document transport platen 72. The auxiliary mask 42 is inserted in front of the document platen 72 through one side of the copier 20 and may include any form of pre-printed data thereon. One corner of the mask is cut out at 43, the size of the cut out 43 corresponding to the size of the document being copied. When it is desired to copy different size documents, the mask 42 may be changed simply by removing the mask and substituting a new mask having a different size cut out. The back 116 of the exposure chamber 40 is open in order that the image of the document 22 and mask 42 may be reflected off of the copy paper mirror 47 positioned at a generally 45° angle through the selected hard copy lens 44, 46 onto the copy paper. The copy paper mirror is positioned to allow the image reflected from the document to pass thereover and be reflected off of the microfilm mirror 49 to the lens of the microfilm camera 48 for exposure of the microfilm.

The exposure chamber is constructed with the side walls 118, top wall 120 and bottom wall 122 making an angle of about 85° with the front of the exposure chamber. The upper wall 120 is inclined upwardly to eliminate obstruction between the document exposure position 28 and the microfilm mirror 49.

The image reflected from the copy mirror 47 is focused on the sheet 30 of copy paper by one of the pair of copy paper lenses 44, 46. The copy paper lenses 44, 46 are mounted on a lens slide 126 which may be shifted between a first position (shown in solid lines) wherein the first lens 44 focuses the image onto the copy paper, the first lens providing a full scale or 1:1 image, and a second position (shown in shadow) wherein the second lens 46 focuses the image onto copy paper, the second lens providing either an enlarged or reduced scale image. Movement of the lens slide 126 operates a reduction selection switch, which as explained in more detail below, enables one of two paper drive clutches interconnecting the copy drive motor with the second copy feed rollers 104 and the belts 106 causing the feed rollers 104 and belts 106 to be driven at different speeds. Since the feed rollers 104 and belts 106 are operated for a fixed time interval, varying their speed alters the position of the sheet 30 of copy paper on the belts 106 so that the leading edge of the copy paper is properly positioned for the lens being utilized. Thus, the larger the image, the farther the leading edge of the copy paper will be transported to accommodate the larger image.

Operation of the copier is best described in conjunction with the circuit diagrams, FIGS. 8–12.

The copier is turned on by closing main power switch SW130 which closes the circuit through the secondary of the step down transformer 132 through appropriate safety interlocks 134, which inhibit operation of the system when the copier is opened, to the main power relay K136. A strobe control switch SW138 in one position connects the strobe control relay K140 across the secondary of the step down transformer 132 through main power switch SW130. In its second position, strobe control switch SW138 bypasses the interlocks so that the copier may be operated while open with the strobe circuit disabled in order to perform normal maintenance and testing operations.

Main power relay K136 when energized closes its contacts K136–1 and K136–2 connecting power from the main power lines 142 and 143 to machine power lines 142a and 143a.

When the relay contacts K136–1, K136–2 are closed, a number of components are energized and remain energized as long as the power is on. Among the components which are energized are the copy feed motor M144, the document vacuum blower M145 which draws a vacuum through the apertures in the document platen 72 and the copy vacuum blower M146 which draws a vacuum through the plurality of apertures in the copy platen 108. In addition, various other exhaust fans and blowers as required (not shown) are also energized for well known purposes of ventilation and cooling.

The document feed motor M147 is also energized through the normally closed contacts TDL148-1 of document discharge jam time delay relay TDL148. The document feed motor M147, therefore, is normally operative unless a document becomes jammed while traversing the document discharge path 52.

In the description of the system operation to follow, it is assumed that paper from roll 32 will be utilized. When the power is turned on, therefore, roll selector switch SW150 is operated to select roll 32. As a result, switch contacts 150-1 complete a circuit through the roll 34 spindle brake solenoid SOL151 causing that brake to be energized to maintain roll 34 stationary. If roll 34 were to be selected, roll selector switch contacts 150-1 would complete the circuit through the roll 32 brake solenoid SOL152 to energize roll 32 spindle brake and maintain roll 32 stationary.

When paper rolls are switched one to the other, roll selector switch contacts SW150-2 complete a circuit through either roll 32 switch over time delay relay TDL153 or roll 3 switch over time delay relay TDL154. When the rolls are changed, by operation of the roll selector switch SW150, a circuit is also completed through contacts SW150-2 through the normally closed contacts of the switch over time delay relay TDL153 or TDL154, through change over relay K155 and through the normally closed contacts of the power change over time delay relay TDL156. As a result, change over relay K155 is energized to cause operation of the paper cutter 102, as explained below, to sever any portion of the copy paper web 94 or 96 from the previously utilized roll which may extend beyond the paper cutter 102, thereby assuring an unobstructed path for the web from a newly selected roll of copy paper.

When the roll selector switch SW150 is operated to select copy paper roll 32, switch contacts 150-2 complete the circuit through roll 32 switch over time delay relay TDL153 and a parallel circuit through the contacts 153-1, switch over cut off relay K155 and the open contacts 156-1 of time delay power change over relay TDL156. The power change over relay TDL156 is simultaneously energized.

The delay of power change over control relay TDL156 is longer than either of the roll switch over time delay relays TDL153 and TDL154, so that the contacts 153-1 are opened before contacts 156-1 are closed when the power is first turned on. Thus, operation of the switch over relay K155 is inhibited when the power is turned on. After the power is on, and when the roll selection switch 150 is operated to change the roll, switch contacts 150-2 complete the circuit through the appropriate roll switch over time delay relay TDL153 or TDL154 and through the associated closed contacts 153-1 or 154-1 to energize switch over relay K155 and the now closed contacts 156-1 for the delay period of the time delay relays TDL153 or TDL154.

The appropriate copy paper drive clutch is selected by energizing either of two copy drive clutch solenoids SOL157 and SOL158. The solenoid energized is determined by the clutch selection switch SW158a operated by the lens slide 126 as a function of the lens to be utilized.

A power relay K159 is connected across the power lines 7, 8 142a, 143a through the normally closed contacts 148-2 of document discharge time delay jam relay TDL148, the normally closed contacts 159a-2 of document feed time delay jam relay TDL159a and the normally closed contacts 160-2 of copy paper time delay jam relay TDL160. When power relay K159 is energized, it closes its normally open contacts 159-1 and 159-2.

Contacts 159-1 complete a circuit to energize infeed brake motor M162 through the normally closed contacts 163-1 of a mutli-copy relay K163, the normally closed infeed timing switch TSW164, the normally closed contact 165-1 of the document feed control relay K165 or, alternatively, the normally open contacts 166-1 of start relay K166, which when closed maintains the infeed motor M162 energized after the document feed control relay contacts 165-1 are opened, the paper roll selection switch contacts 150-3, through either of the normally closed roll 32 empty switch SW167 or the normally closed roll 34 empty switch SW168, each of which opens when the respective paper rolls are empty, and through either the normally closed microfilm empty switch SW169 which remains closed as long as there is unexposed microfilm in the microfilm camera 48 or the microfilm on/off switch contacts SW170-1 which are closed to bypass the microfilm empty switch SW169 when it is not desired to make microfilm copies. Auto feed locking control relay LK171 and the normally closed contacts K172-1 of the document detection relay K172 are connected in parallel with the infeed brake motor M162, the auto feed locking control relay LK171 also being energized when the power relay contacts K159-1 are closed.

Power relay contacts K159-2 when closed, enable the circuit through the auto feed motor M173 through the contacts K171-1 of the auto feed control locking relay K171, closed when the auto feed control locking relay LK171 is energized, through the contacts K174-1 of the auto feed reset relay K174, through the normally closed contacts TDL175-1 of the auto feed time delay shut off relay TDL175, all of which are connected in parallel with the infeed brake motor M162. The auto feed time delay shut off relay TDL175 is connected in series with the auto feed control relay contacts K171-1 and the contacts K174-1 of the auto feed reset relay K174 through the normally closed contacts SW176-1 of the auto feed reset switch SW176.

Thus, it can be seen, that when the copier is turned on, the infeed motor M162 is immediately energized and the circuit through the auto feed motor M173 is enabled and will be energized upon operation of the auto feed reset relay K174.

The auto feed reset relay K174 is energized through the normally closed contacts K155-1 of the switch over relay when reset switch 176 is operated to close its contacts SW175-2 SW176-2. In addition to closing its contacts K174-1 to energize the auto feed motor M173, the auto feed reset relay K174 also closes its normally open holding contacts K174-2 connected in parallel with the auto feed reset switch contacts SW176-2 to maintain the auto feed reset relay K174 energized after release of the reset switch.

When the auto feed reset switch SW176 is released, contacts SW176-1 are closed completing a circuit through the auto feed time delay shut off relay TDL175. If the auto feed motor M173 is not otherwise shut off as a result of a document being detected by the document sensing switch 88, it will open its contacts TDL175-1 after a selected interval to prevent additional documents being fed into the copier from the automatic document feeder.

When a document is transported by the automatic document feeder into the copier and carried by the document infeed rollers 58, driven by the document infeed brake motor M162 into the document feed system, it engages, as explained above, document sensing switch SW88 momentarily closing that switch to energize auto feed reset control relay RK171 and document detection relay K172. When document detection relay K172 is energized, it opens its normally closed contacts K172-1 in series with the auto feed control locking relay LK171 to de-energize that relay. Simultaneously, the auto feed control reset relay RK171 is energized to open its contacts K171-1 thereby de-energizing the circuits through the auto feed motor M173 and the auto feed time delay shut off relay TDL175.

The energized document detection relay K172 also causes its contacts K172-2 (FIG. 10) to close to energize the document clutch/brake relay K177 through the normally closed contacts TDL148-2, TDL159a-2 and TDL160-2 of the document feed jam, document discharge and copy jam time delay relays, respectively, to initiate operation of the document feed system by energizing the clutch connecting the document feed motor M144 to the pulley 86. The contacts 172-2 of the document detection relay K172 are connected in parallel with the contacts K165-2 of the document feed control relay and the contacts K178-1 of the last copy relay K178. The document clutch brake relay K177 may also be energized by closing a manually operated jog switch SW179 to enable the document feed system to be operated manually when desired.

The energized document detection relay K172 also closes its contacts K172-3 to energize the start relay K166 through the start timing switch TSW180 and the normally closed contacts of copy cycle timing switch TSW181. The start relay K166 when energized closes its holding contacts K166-2 to bypass the copy cycle timing switch TSW181. Normally open contacts K163-2 of the multi-copy relay K163 are connected in parallel with the holding contacts K166-2 of the start relay K166 to maintain that relay energized when multiple hard copies are produced, as explained in more detail below.

The normally closed contacts K163-2 of the multi-copy relay also complete a circuit through the start relay contacts K166-3, document feed timing switch TSW182 and document feed control relay K165. The start relay contacts K166-4 when closed complete the circuit to energize the copy paper clutch/brake relay K183. The copy paper clutch/brake relay K183 may also be energized by the closure of the last copy relay contacts K178-2 connected in parallel with the start relay contacts K166-4 or through the normally open contacts of the copy cycle timing switch TSW181.

The document feed control relay K165 is also energized, when the document feed timing switch TSW182 is closed, through the normally closed contacts of the document registration switch SW183 which maintains the document feed control relay K165, and therefore, the document clutch/brake relay K177, energized until the document reaches the exposure position. The document registration switch is actuated by the document when it reaches the exposure position to open the circuit through the document feed control relay K165 thereby de-energizing document clutch/brake relay K177 to stop the document feed system with the document in position for exposure.

Start relay contacts K166-5 complete a circuit through jam reset switch SW184, document feed jam relay K185 and document registration switch SW183. Document feed jam relay K185, when energized, closes its holding contacts K185-1 bypassing the start relay contacts K166-5. The document feed jam relay K185 also closes its contacts K185-2 to energize document feed time delay jam relay TDL159a which opens its contacts after a selected time interval, unless that circuit is opened by actuation of the document registration switch SW183 indicating that the document has arrived at the exposure position. The delay period of document feed time delay jam relay TDL159 is greater than the time required to transport the document to the exposure position.

Start contacts K166-6 complete a circuit through the jam reset switch SW184 and copy jam relay K187. Copy jam relay K187 closes its holding contacts K187-1 bypassing the start relay contacts K166-5 and maintaining the copy jam relay K187 energized through copy jam release switch SW188 which is actuated when the exposed and processed sheet of copy paper is delivered to the copy paper discharge tray 112. Copy jam relay K187 also closes its contacts K187-2 to energize copy paper time delay jam relay TDL160 which will open its contacts if a copy paper is not received in the copy paper tray within the normal time interval.

The document discharge jam relay K189 is connected in a circuit including jam reset switch 184, document discharge jam release switch SW190 and document discharge jam start switch SW191. Document discharge jam start switch SW191 is closed as a document is initially transported from the document exposure position to the outlet 78 through the document discharge path 52 and document discharge jam release switch SW190 is actuated and opened to de-energize the document discharge jam relay K189 as the document is delivered to the outlet 78.

When document discharge jam relay K189 is energized, it closes its holding contacts K189-1 connected in parallel with the document discharge start jam switch 191 to maintain document discharge jam relay K189 energized. Contacts K189-2 of the document discharge jam relay K189 close the circuit through the document discharge time delay jam relay TDL148 which opens its contacts if the document is not delivered to the outlet 78 within the normal time interval.

When the document to be copied arrives at the exposure position and actuates document registration switch 183, the normally closed contacts of the document registration switch SW183 are opened to de-energize document feed jam relay K185 and to open the circuit through the document feed control relay K165. The actuated document registration switch SW183 closes a circuit through normally closed contacts K163–3 of the multicopy relay K163, the normally closed contacts K192–1 of the cutter relay K192 to energize last copy time delay cycle relay TDL193. The last copy time delay cycle relay TDL193 closes its contacts TDL193–1 to energize last copy relay K178, if another document to be copied has not been introduced into the copier, for the purpose of transporting the last copy produced out of the copier and for transporting the copied document to the copier outlet.

The start relay K166, when energized, also initiates the copy paper feed cycle by closing its contacts K166–7 (FIG. 11) to complete the circuit through cutter/paper release timing switch 194 to energize either roll 32 spindle brake release locking relay LK195 and roll 32 copy paper release solenoid SOL196 or roll 34 copy paper spindle brake release relay LK197 and roll 34 copy paper release solenoid SOL198 as determined by the copy paper selection switch contacts 150–4. Simultaneously, timing relay K199 is energized through the normally closed contacts K178–3 of the last copy relay K178 to close the timing start switch TSW200 energizing timer 201. The timer 201, which, for example, may be a cam drive motor driving a primary synchronizing cam system to operate the various timing switches, or any other suitable mechanism, effects synchronization of system operation. Timing start switch 200 is maintained closed for one complete cycle of its timer 201.

Cutter paper release timing switch TSW194 is actuated shortly after timer 201 is energized to complete a circuit through cutter relay K192, solenoid control relay K202, start relay contacts K166–8, bypassed by the holding contacts K192–2 of the cutter control relay K192. The solenoid control relay K202 opens its contacts 202–1 and 202–2 in series with the copy paper release solenoids SOL196 and SOL198, respectively to deenergize the solenoids. Since cutter control relay K192 is energized through one of the start relay contacts, which is energized in response to the introduction of a document into the document feed system, cutter control relay contact K192–1 is open to prevent energization of the last copy time delay cycle relay TDL193 which is to be actuated only when no additional documents are to be copied.

Contacts 166–6 of start relay K166 also complete the charging circuit through strobe unit PP II through the closed contacts 140–1 and 140–2 of strobe control relay K140 to charge the strobe unit for exposure.

When the cutter control relay K192 is energized, it closes its contacts K192–3 to enable the circuit including spindle brake release reset relay RK195 and RK197 and cutter relay K203. The cutter relay K203 and the paper spindle brake reset relays RK195 and RK197 are energized by the closure of the cutter timing switch TSW204. The spindle brake reset relays close the contacts K195–1 and K197–1 to re-energize the respective roll brake solenoids SOL205 or SOL206 for roll 32 and roll 34, respectively.

Simultaneously, cutter relay K203 closes its contact 203–1 to energize the cutter solenoid SOL207 to operate the paper cutter to sever a discrete sheet of copy paper of desired length from the web from the selected roll of copy paper. As indicated above, whenever a new roll is selected, switch over relay K155 is momentarily energized closing its contacts K155–2 and K155–3 in series with the spindle brake reset relays and the cutter relay to insure that the roll remains stationary during change over and that the leading edge of the selected roll that might be protruding past the cutter is severed.

If microfilm copies are also to be produced, the microfilm control relay K208 (FIG. 12) is energized through contacts K192–4 of the cutter control relay K192, contacts K165–4 of the document feed control relay K165 and microfilm on/off switch SW170–2. Energization of the microfilm control relay K208 closes holding contacts 208–1 which bypass the contacts 165–4 of the document feed control relay.

The microfilm circuit is connected to the secondary of the microfilm step down transformer T209, the microfilm being advanced by the microfilm motor M210. The microfilm motor M210 is energized through contacts 208–2 and microfilm starter timing switch TSW211. The microfilm starter timing switch TSW211 is closed only momentarily to initiate operation of microfilm motor M210, but the operation of microfilm motor M78 drives a microfilm advance timer to close microfilm advance timing switch 212 which remains closed until the microfilm is advanced to the next frame.

Microfilm control relay K208 also closes contacts K208–3 to enable the microfilm shutter solenoid SOL213 which is energized by closure of microfilm shutter and strobe timing switch TSW214. The microfilm shutter and strobe timing switch TSW214 enables the strobe trigger time delay relay TDL215 which is energized upon de-energization of the document feed control relay K165 closing contacts 165–5. Strobe trigger delay relay 215 triggers the strobe lamps after a preselected delay by closing contacts 215–1 (FIG. 11).

In operation, assuming that the main power switch and main strobe switch have been closed and all the preliminary steps have been taken, including selection of the desired roll of copy paper by starting roll selector switch 150, selection of the desired lens 44 or 46, thereby operating paper clutch solenoid selector switch 158a to enable the desired paper drive clutch and the setting of the cutter cam so that the cutter relay K203 is energized to sever the desired length of copy paper, the copier is ready to produce copies.

The automatic document feeder reset switch 176 is depressed thereby energizing auto feed reset relay K174 to start the auto feed motor M173. Automatic document feeder delivers a document to the infeed rolls being driven by the infeed brake motor M162. As the document is transported from infeed rolls to the feed rolls, it actuates detection and start switch 88 energizing auto feed control reset relay RK171 to shut off the automatic document feeder, document detection relay K172 to energize the document feed clutch starting the document feed rollers by energizing relay K177, and energizing start relay K166 initiating the copy paper feed by, thereby energizing relay K183.

The start relay K166 also causes the roll 32 spindle brake to be released by energizing relay LK195 and connects paper drive to the first drive rolls by energizing the copy paper release solenoid 196 to initiate feeding of the copy paper. After the selected length of copy paper has been fed from the copy paper roll 32, timing switch 194 is actuated energizing the cutter control relay K192 and the solenoid control relay K202. This energizes the spindle copy paper brake and disconnects the first paper drive rolls and also severs the desired length of web from the copy paper roll. The copy paper brake clutch relay K183 remains energized through copy cycle timing switch TSW181 until the copy paper is transported into the exposure chamber in the desired position as determined by the clutch selection switch 158a.

Shortly after the document enters the document feed system, infeed timing switch TSW164 is opened to de-energize the infeed brake motor M162. As explained above, document detection and start switch also initiates the document feed jam cycle by energizing time delay relay TDL160 through contact K187-2. Document feed jam relay K185 is de-energized when the document reaches the exposure position where the document activates the registration switch 183 to open the circuit and de-energize the feed jam relay K185.

Registration switch 183 when actuated also energizes last copy time delay cycle relay 193 which closes its contacts 193-1 after a delay to energize the last copy relay K178 if another document to be copied has not reached the document detection switch 88 within the delay period.

The document detection relay K172, energized by the actuation of document detection switch 88 energizes start relay K166. Contacts K166-7 complete a circuit through the timing relay K199 to close timing start switch 200 energizing the timer 201 to sychronize various operations of the copier. Document feed timing switch TSW182 is closed almost immediately upon energization of the timer 201 to energize document feed control relay K165 (FIG. 10).

Cutter control relay K192 closes contacts 192-4 to energize the microfilm control relay K208. This causes the microfilm advance motor M210 to be energized advancing the unexposed frame of the microfilm into position behind the lens for exposure. Microfilm control relay contacts 208-3 enable shutter solenoid 213 which is energized by timing switch 214. Timing switch 214 also enables the strobe trigger time delay relay 215 which is energized when the document feed control relay K165 is de-energized as a result of document feed timing switch 182 opening.

After exposure, the timing switches open the circuit through the microfilm shutter and strobe discharge time delay relay. As the timer 201 completes its cycle, infeed timing switch TSW164 is closed enabling the document infeed motor M162 and the auto feed motor M173 to transport the next document through the document feed system. As explained above, the document feed system is energized and not only transports the document to the exposure position, but transports the document in the exposure position through the document exit path to the copier outlet.

If no document is detected by the document detection switch 88 to open the circuit through the last copy time delay cycle relay 193, contacts 193-1 close to energize last copy relay K178 which is operative to energize the document relay K177 and transport the document to the copier outlet and to energize the copy drive relay K183 in order to transport the sheet of copy paper from the exposure chamber through the processor to the copy paper tray.

The operation of the copier as outlined above, pertains to the production of a single hard copy. When it is desired to produce multiple hard copies, the copy selection switch 216 (FIG. 12), a two deck multi-position switch is set at the desired number of copies. At any time more than one copy is selected, the contacts of deck B complete the circuit through multiple copy time delay control relay TDL218, the contacts K166-9 of the start relay and the normal closed contacts of the anti-jam time delay relays TDL145-2, TDL159a-2 and TDL160-2. Multiple copy time delay relay contacts 218-1 are closed after the document has passed out of the infeed rollers to energize multiple copy relay K163. As explained above, multiple copy relay contacts 163-1 are opened when the multiple copy relay is energized to de-energize both the infeed motor M162 and the auto feed motor M173. Contacts 163-2 maintain the timing relay release solenoid energized to repeat the timing cycle for the number of copies desired. Contacts K163-3 open the circuit to the last copy time delay relay TDL193 to prevent its actuation after an exposure has completed, since with multiple copies, another document will, of course, not be introduced into the document feed system.

Contacts 163-4 open the circuit through document feed control and exposure relay K165 so that exposure of the copy paper is initiated immediately upon closure of the exposure timing switch TSW214 since no delay is required for the microfilm shutter there being no microfilm copies produced. Contacts 163-5 bypass the start switch contacts 166-9 and act as a holding contact to maintain time delay relay 218 energized which in turn maintains multiple copy relay K163 energized.

Contact 163-6 enables stepping switch relay K217 which is energized each cycle by the closure of start relay contacts 166-10. This causes the stepping of multiple copy switch 216 to advance one position. When the stepping switch contact 217-1 has reached the contact of the multiple copy switch indicative of the desired number of copies, stepping switch reset control relay K219 is energized through timing switch 220 to reset the stepping switch 216 to its start position. The reset control relay K219 is maintained energized through its holding contacts 219-1 which bypass timing switch 220.

Contacts 219-2 of reset control relay energize reset relay 217R which remains energized to reset the stepping switch 216. When the stepping switch is reset, contacts 217-1 open to de-energize reset control relay 219. Contacts 219-3 are opened when reset control relay 219 is energized thereby opening the circuit through the multiple copy time delay relay 218 and the multiple copy relay K163 effectively returning the copier to a single mode operation for the last copy.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. Apparatus for producing a selected number of different types of copies of original documents on selected ones of a plurality of diverse copy media comprising document feed means for automatically transporting an original document to be copied to a document exposure position, means responsive to said document feed means transporting said original document for positioning each of selected ones of a plurality of diverse copy media for exposure to a focused image of said original document, document registration indicating means actuated in response to the presence of said original document at said document exposure position, and exposure control means for simultaneously exposing said selected ones of said plurality of diverse copy media to a focused image of said original document when said document is located at said document exposure position in response to actuation of said document registration indicating means to produce copies of said original document on each of said selected ones of said plurality of copy media.

2. Apparatus as claimed in claim 1 including selectively operable means for selecting one of said diverse copy media, and wherein said exposure control means includes copy control means operable in response to operation of said copy media selection means for effecting exposure of said selected one of said copy media to produce a first type copy thereon.

3. Apparatus as claimed in claim 2 wherein only a portion of said selected one of said copy media is exposed to said focused image of said original document during any one exposure, said copy control means including copy drive means for automatically replacing a previously exposed portion of said selected one of said copy media with an unexposed portion thereof prior to the next exposure thereof to said focused image.

4. Apparatus as claimed in claim 3 wherein said copy control means includes means for detecting the absence of unexposed portions of said selected one of said copy media to inhibit operation of at least a portion of said document feed means.

5. Apparatus as claimed in claim 2 including copy number selection means selectively operable to select the number of other type copies to be produced on other of said copy media, said copy number selection means including means to inhibit operation of said copy control means after exposure of said selected one of said copy media until said selected number of other type copies have been produced on said other of said copy media.

6. Apparatus as claimed in claim 1 including copy feed means operable to locate a discrete sheet of one of said copy media in position for exposure to said focused image in response to the presence of a document in said document feed means, said copy feed means including copy size selection means for selecting the size of said discrete sheet, and copy transport means for transporting said selected discrete sheet into said copy exposure position.

7. Apparatus as claimed in claim 6 including copy number selection means selectively operable to select the number of copies of said original document to be made on said discrete sheets, said copy feed means being operable in response to the number of copies selected by said copy number selection means to sequentially locate a number of selected discrete sheets corresponding to the selected number of copies for successive exposures thereof to said focused image of said original document.

8. Apparatus as claimed in claim 7 wherein said copy feed means is operable to locate the first of said number of discrete sheets for exposure in response to said document feed means transporting said original document to said document exposure position, and is further operable to locate subsequent selected discrete sheets in position for exposure in response to termination of a previous exposure.

9. Apparatus as claimed in claim 6 wherein each of said discrete sheets is obtained from a selected one of a plurality of generally continuous webs, said copy size selection means including web selection means operable to select one of said webs, and web severing means for severing a sheet from said selected web.

10. Apparatus as claimed in claim 9 wherein said copy transport means includes first copy drive means for transporting said selected web towards said copy exposure position past said web severing means, and second copy drive means for transporting said severed sheet to said copy exposure position.

11. Apparatus as claimed in claim 10 wherein said first copy drive means includes first copy brake means, and means for de-energizing and energizing, respectively, said first copy drive means and said first copy brake means substantially simultaneously with the operation of said web severing means.

12. Apparatus as claimed in claim 6 wherein the focused image to which said sheet is exposed may be of different sizes, and including means for selecting the size of the focused image to which said sheet is exposed.

13. Apparatus as claimed in claim 12 including copy sheet registration means for stopping said copy transport means when said discrete sheet is in position for exposure, said copy sheet registration means being responsive to said image size selecting means for adjusting said copy exposure position in accordance with the selected size of said focused image.

14. Apparatus as claimed in claim 6 wherein said copy transport means is operable to simultaneously transport an exposed discrete sheet from said copy exposure position and to transport another selected discrete sheet to said copy exposure position.

15. Apparatus as claimed in claim 14 wherein said copy transport means is operable in response to the termination of said exposure and to the absence of an original document in said document feed means to only transport said exposed discrete sheet from said copy exposure position.

16. Apparatus as claimed in claim 1 including document feed control means selectively inactivating said document feed means in response to the actuation of said document registration indicating means, said document feed control means reactivating said document feed means after termination of said exposure for transporting said document from said document exposure position to the document outlet of said apparatus.

17. Apparatus as claimed in claim 16 including first timing means actuated a selected time interval after completion of said exposure, and document infeed sensing means actuated in response to the introduction of a document into said document feed means, said document feed control means reactivating said document feed means in response to actuation of said first timing means and alternatively in response to actuation of said document infeed sensing means within said time interval.

18. Apparatus as claimed in claim 1 including document infeed means for transporting a document from the document inlet of said apparatus and for introducing said document into said document feed means, document infeed sensing means actuated in response to the introduction of a document into said document feed means, and document infeed control means for inactivating said document infeed means in response to actuation of said document infeed sensing means, whereby undesired introduction of a document into said document feed means is prevented.

19. Apparatus as claimed in claim 18 wherein said document infeed control means is responsive to completion of said exposure for reactivating said document infeed means.

20. Apparatus as claimed in claim 1 wherein said document feed means includes dynamic document guide means operative to maintain said document in proper position in said document feed means.

21. Apparatus as claimed in claim 1 wherein said document feed means defines a document feed path, said document feed means including a plurality of pairs of document feed rollers disposed along said path, the rollers of each pair disposed on opposite sides of said path and defining a nip therebetween, said nips defining said document feed path.

22. Apparatus as claimed in claim 21 including a plurality of flexible tensioned endless belt means extending around adjacent document feed rollers on each side of said document feed path, a portion of each of said plurality of flexible tensioned endless belt means disposed adjacent to and extending along said document feed path.

23. A method for producing different type copies of an original document on diverse copy media including the steps of automatically locating a document to be copied in position to be copied, selecting certain ones of a plurality of diverse copy media on which different type copies are to be produced, automatically locating said selected ones of said plurality of diverse copy media in position to produce copies of said original document thereon, detecting the presence of said document and said selected ones of said diverse copy media at their respective copy positions and exposing said selected ones of said diverse copy media to a focused image of said original document in response to the detection of said original document and said copy media in their respective positions.

24. A method as claimed in claim 23 including the step of selectively producing a different number of copies on at least one of said selected one of said diverse copy media.

* * * * *